United States Patent [19]
Samec et al.

[11] Patent Number: 5,763,054
[45] Date of Patent: Jun. 9, 1998

[54] ANTI-REFLECTION TREATMENT FOR OPTICAL ELEMENTS

[75] Inventors: Thomas K. Samec, Los Angeles; Paul S. Lee, La Palma; Mikio Larry Yujiri; Barry H. Stark, both of Torrance, all of Calif.

[73] Assignee: TRW Inc., Redondo Beach, Calif.

[21] Appl. No.: 710,232

[22] Filed: Sep. 13, 1996

[51] Int. Cl.⁶ ........................................................ B32B 3/00
[52] U.S. Cl. ........................... 428/195; 428/196; 428/201; 428/224; 428/225; 351/44; 351/47; 351/53
[58] Field of Search ...................................... 428/195, 196, 428/201, 224, 225; 351/44, 47, 53

[56] References Cited

U.S. PATENT DOCUMENTS

| | | |
|---|---|---|
| 2,887,684 | 5/1959 | Dexter et al. . |
| 3,002,190 | 9/1961 | Oleesky et al. . |
| 3,465,361 | 9/1969 | Lode . |
| 4,190,321 | 2/1980 | Dorer . |
| 4,321,299 | 3/1982 | Frosch et al. . |
| 4,340,276 | 7/1982 | Maffitt et al. . |
| 4,582,111 | 4/1986 | Kuehn et al. . |
| 4,631,214 | 12/1986 | Hasegawa . |
| 4,645,704 | 2/1987 | Hellwig . |
| 4,725,475 | 2/1988 | Fiscus et al. . |
| 4,812,031 | 3/1989 | Evans . |
| 4,861,651 | 8/1989 | Goldenhersh . |
| 5,047,783 | 9/1991 | Hugenin . |
| 5,181,141 | 1/1993 | Sato et al. . |
| 5,237,334 | 8/1993 | Waters . |
| 5,385,623 | 1/1995 | Diaz . |
| 5,530,247 | 6/1996 | McIver et al. . |

OTHER PUBLICATIONS

"Surface Matching of Dielectric Lenses", by E. Jones and S. Cohn, Summary of Paper No. 37.2, 1954, IRE National Convention, New York, NY, Mar. 22–25, 1954.

"Antireflection Treatment in Silicon Using Binary Optics Technology", by M. M. Motamedi, W. H. Southwell and W. J. Gunning, Applied Optics, vol. 31, No. 22, p. 437, Aug., 1992.

Primary Examiner—Patrick Ryan
Assistant Examiner—Elizabeth Evans
Attorney, Agent, or Firm—Michael S. Yatsko

[57] ABSTRACT

An anti-reflection coating for optical elements and a method for forming an anti-reflection coating on an optical element includes one or more layers of a woven plastic mesh material that may be layered on the surface of an optical element such as the lens and secured thereto with a suitable adhesive or pressed on to the surface by either a peripheral retaining ring or bodily pressed in place by a low loss, low dielectric medium. The number and thickness of the layers of the woven plastic mesh material are selected to provide optimal reduction of reflection losses.

17 Claims, 5 Drawing Sheets

| Run | Mesh Information | | | | with mat'l | w/o mat'l | w/o mat'l | w/o mat'l | avg. with | =10log( |
|---|---|---|---|---|---|---|---|---|---|---|
| | Type | Rotation | # | Thickness | ecco out | ecco in | ecco out | ecco in | ecco in | (b-f)/(d-f)) |
| | | degrees | | mils | +/-0.002V | +/-0.002V | +/-0.002V | +/-0.002V | +/-0.003V | |
| | | | | 0 | | | | | | 0.000 |
| 8 | fine | 0 | 1 | 8 | 1.917 | -1.077 | 1.899 | -1.077 | -1.077 | 0.026 |
| 9 | fine | 0 | 2 | 13 | 1.960 | -1.076 | 1.896 | -1.076 | -1.078 | 0.093 |
| 10 | fine | 0 | 3 | 18 | 2.007 | -1.079 | 1.895 | -1.078 | -1.0785 | 0.151 |
| 11 | fine | 0 | 4 | 23 | 2.029 | -1.079 | 1.895 | -1.079 | -1.079 | 0.191 |
| 12 | fine | 0 | 5 | 28 | 2.027 | -1.082 | 1.892 | -1.077 | -1.0795 | 0.193 |
| 13 | fine | 0 | 6 | 32 | 1.980 | -1.077 | 1.895 | -1.077 | -1.077 | 0.122 |
| 14 | fine | 0 | 7 | 37 | 1.915 | -1.077 | 1.892 | -1.078 | -1.0765 | 0.034 |
| 15 | fine | 0 | 8 | 43 | 1.874 | -1.077 | 1.894 | -1.078 | -1.0775 | -0.029 |
| 16 | fine | 0 | 9 | 48 | 1.852 | -1.077 | 1.886 | -1.078 | -1.0775 | -0.050 |
| 17 | fine | 0 | 10 | 52 | 1.874 | -1.079 | 1.887 | -1.080 | -1.0795 | -0.019 |
| 18 | fine | 0 | 5 | 28 | 2.014 | -1.083 | 1.886 | -1.079 | -1.081 | 0.183 |
| 19 | fine | 0 | 4 | 23 | 2.032 | -1.081 | 1.885 | -1.081 | -1.081 | 0.210 |
| 20 | fine | 0 | 4 | 23 | 2.023 | -1.080 | 1.881 | -1.083 | -1.0815 | 0.203 |
| 21 | coarse | 0 | 1 | 25 | 1.999 | -1.083 | 1.882 | -1.086 | -1.0845 | 0.168 |
| 22 | coarse | 0 | 2 | 37 | 1.950 | -1.088 | 1.879 | -1.085 | -1.0886 | 0.103 |
| 23 | coarse | 0,45 | 2 | 44 | 1.903 | -1.082 | 1.881 | -1.083 | -1.0825 | 0.032 |
| 24 | mix | 0,0 | cf | "33" | 2.003 | -1.081 | 1.882 | -1.080 | -1.0805 | 0.174 |
| 25 | mix | 0,0,0 | cfc | "45" | 1.866 | -1.081 | 1.883 | -1.080 | -1.0805 | -0.026 |
| 26 | mix | 0,0,45 | cfc | "45" | 1.870 | -1.082 | 1.885 | -1.085 | -1.0835 | -0.022 |
| 27 | coarse | 0 | 1 | 25 | 1.995 | -1.085 | 1.886 | -1.085 | -1.085 | 0.156 |
| 28 | mix | 0,0 | cf | "33" | 2.007 | -1.086 | 1.885 | -1.088 | -1.088 | 0.175 |
| 29 | mix | 0,45 | cf | "33" | 2.004 | -1.087 | 1.884 | -1.087 | -1.087 | 0.172 |
| 30 | mix | 0,0,0 | cff | "38" | 1.997 | -1.086 | 1.885 | -1.085 | -1.0855 | 0.161 |
| 31 | mix | 0,0,0,0 | cfff | "43" | 1.976 | -1.085 | 1.881 | -1.086 | -1.0855 | 0.137 |
| 32 | mix | 0,0 | cf | "33" | 2.003 | -1.084 | 1.883 | -1.083 | -1.0835 | 0.172 |
| 33 | coarse | 0 | 1 | 25 | 1.996 | -1.088 | 1.883 | -1.084 | -1.085 | 0.182 |
| 34 | fine | 0 | 4 | 23 | 2.025 | -1.086 | 1.883 | -1.086 | -1.086 | 0.203 |
| 35 | fine | 0,45,0,45 | 4 | 24 | 2.023 | -1.086 | 1.884 | -1.087 | -1.0865 | 0.199 |
| | | | | 33 | | | | | | 0.172 |
| | | | | 0 | | | | | | 0 |
| | | | | "XX"=not measured | | | | | | |
| | | | | | | | | | 4% gain= | 0.170 |

FIG. 7

ANTI-REFLECTION TREATMENT FOR OPTICAL ELEMENTS

BACKGROUND OF THE INVENTION

1. Field of the Invention

The present invention relates to an anti-reflection coating for use on optical elements as well as a method for applying an anti-reflection coating on optical elements, such as lenses, and more particularly, to an anti-reflection coating which includes one or more layers of a woven mesh material layered on the surface of the optical element, such as a lens, in which the number and thickness of layers is selected to provide optimal reduction of reflection losses from the optical element.

2. Description of the Prior Art

Various types of coatings are known to reduce the reflectivity of various optical elements, such as lenses, to increase the transmittance of the optical component thereby improving the overall gain of the optical system. Examples of such coatings are disclosed in U.S. Pat. Nos.: 2,887,684; 3,002,190; 4,190,321; 4,321,299; 4,340,276; 4,631,214; 4,725,475; and 5,181,141. Such anti-reflection coatings are also disclosed in: "Surface Matching of Dielectric Lenses", by E. Jones and S. Cohn, Summary of Paper no. 37.2, 1954 IRE National Convention, New York, N.Y., Mar. 22–25, 1954 and "Antireflection Treatment In Silicon Using Binary Optics Technology", by M. Motamedi, W. H. Southwell and W. J. Gunning, *Applied Optics*, Vol.31, No. 22, P.437, (Aug.1992). Various methods for forming the anti-reflection coatings are also known. For example, as disclosed in "Surface Matching of Dielectric Lenses", supra, a quarter wavelength layer of an anti-reflection coating is simulated by a grooved or waffle pattern on the surface of a dielectric lens as illustrated in FIGS. 1 and 2. The grooved surface may be formed by die-casting the optical element complete with the grooved surface.

While such a method provides an adequate anti-reflection coating, such a method is not without limitations. For example, the above-mentioned method is relatively imprecise and is known to provide varying results. As such, a relatively high risk exists that the optical element, die-cast with the grooved pattern, will provide inadequate performance. If so, since the process is irreversible, the optical element is discarded and the process repeated again with a new optical element. In some applications, the grooved surface forming the anti-reflection coating is known to be formed on a relatively expensive optical element, such as, for example, a lens, used on a millimeter wave imaging system. Such lenses are relatively expensive to replace.

SUMMARY OF THE INVENTION

It is an object of the present invention to provide an anti-reflection coating for an optical component which solves various problems in the prior art.

It yet is another object of the present invention to provide an anti-reflection coating which can be relatively easily applied to an optical surface.

It is yet a further object of the present invention to provide a method for applying an anti-reflection coating to an optical element by way of an adjustable and reversible process.

Briefly, the present invention relates to an anti-reflection coating for optical elements and a method for forming an anti-reflection coating on an optical element which includes one or more layers of a woven plastic mesh material that may be layered on the surface of an optical element, such as a lens, by a reversible process. Once the performance of the optical element is determined, the layers of woven mesh material can be secured to the optical element with a suitable adhesive or by way of various known mechanical clamping means. The number and thickness of the layers of the woven mesh material may be selected to provide optimal reduction of reflection losses. Various commercially available woven mesh materials are suitable for use.

DESCRIPTION OF THE DRAWINGS

These and other objects of the present invention will be readily understood with reference to the following specification and attached drawing wherein:

FIG. 7 is a tabular illustration of the power transmission through the front surface of the primary lens illustrated in FIG. 6 with and without the anti-reflection coatings of the present invention applied to the primary lens surface to determine the improvement in power transmission provided by the anti-reflection coatings in the accordance with the present invention.

A DETAILED DESCRIPTION OF THE INVENTION

The present invention relates to an anti-reflection coating that can be relatively easily and quickly applied to a surface of an optical component, such as a lens. An important aspect of the invention is that the anti-reflection coating can be applied to the surface of the lens without the need to die-cast grooves into the lens surface, by way of a reversible process.

Figure 1:
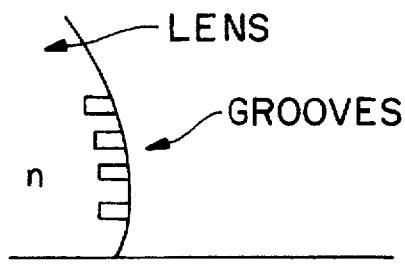
FIG. 1 is a side elevational view of a known grooved lens formed from a generally convex lens with a plurality of grooves used to simulate a quarter wavelength anti-reflection layer.
Figure 2:
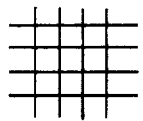
FIG. 2 is a top view of the known grooved lens illustrated in FIG. 1.

As is known in the art, the thickness of an anti-reflection coating is selected to be one quarter wavelength, as measured in the material of the coating in order to provide a one-half wavelength path difference between the reflection from a first surface and a second surface of the optical device, such as a lens, to which the anti-reflection coating is applied in order to provide destructive interference. As discussed in "Anti-Reflection Treatment In Silicon Using Binary Optics Technology" by M. E. Motamedi, W. H. Southwell and W. J. Gunning, *Applied Optics*, Vol. 31, No. 22, Aug. 1, 1992, p. 437, the optimum index of refraction for the coating is equal to the square root of the index of refraction of the lens or other optical component. As discussed therein, a grooved or waffle iron surface on the surface of the lens as illustrated in FIGS. 1 and 2, can be used to simulate a quarter-wave reflective layer. As discussed above, the grooves are formed by die-casting the lens with the waffle iron pattern formed thereon. As discussed above, such a method is relatively imprecise, thus providing varying performance. Since the method is irreversible, die-cast lenses with poor performance are known to be discarded.

Figure 3:
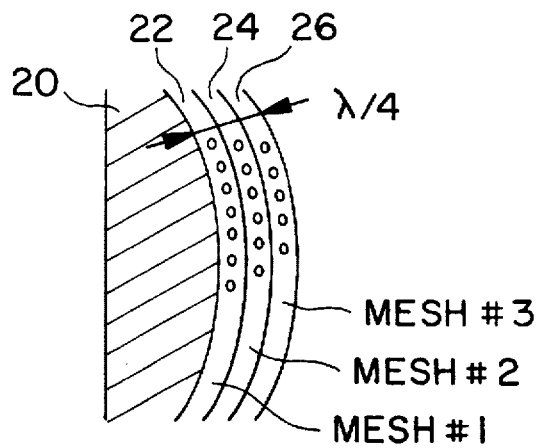
FIG. 3 is a side elevational view of a generally convex lens, shown with a multiple layer of woven plastic mesh material applied to an outside surface of the lens, forming an anti-reflection coating in accordance with the present invention.
Figure 4:
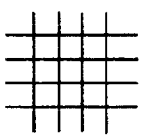
FIG. 4 is a top view of the lens illustrated in FIG. 3.

The anti-reflection coating and method for applying the anti-reflection coating to an optical element, such as a lens, in accordance with the present invention, is illustrated in FIGS. 3 and 4. The anti-reflection coating also simulates a quarter-wave reflective layer by way of a waffle-like pattern as illustrated in FIG. 4, similar to the grooved lens illustrated in FIG. 2. However, the method for forming the anti-reflection coating in accordance with the present invention is reversible. In particular, the layers of woven mesh material can be temporarily secured to the surface of the optical element, for example, by a material that is transparent to the electromagnetic wavelength of interest. Once the suitability of the anti-reflection coating is determined, the multiple layers can be secured to the optical element with a suitable adhesive or with various mechanical clamping means or pressed onto the surface by either a peripheral retaining ring or bodily pressed in place by a low loss dielectric medium. Should the performance be unacceptable, layers of the woven material can be relatively easily added or removed to improve the anti-reflection performance of the optical element without the need to discard the optical element. Referring to FIG.3, one or more layers 22, 24 and 26 (shown with 3 for illustration) of a woven plastic mesh material is applied to an outside convex surface of lens 20. Although the layers, 22, 24 and 26 are shown applied to the convex surface of a lens, the anti-reflection coating and method in accordance with the invention is also suitable for various other types of surfaces, such as concave surfaces (not shown). Various woven plastic materials are suitable for use for the anti-reflection coating, such as polyester, polypropyleal, ETFE 9-710/53, Nylon 3-300 and Nylon 3-160 in various mesh sizes including fine, course and mixed. The number as well as the thickness of the layers are selected to minimize reflection losses through the optical device as discussed below.

The layers 22, 24 and 26 of the woven plastic mesh material may be secured to the lens 20 or other optical element by various methods. For example, the woven plastic mesh material can be stretched over the optical element and secured thereto by an adhesive that is transparent to the electromagnetic radiation of interest. For example, if the optical element is to be used in a millimeter wave (MMW) imaging system, an adhesive is selected that is transparent to microwaves. Various adhesives are suitable for this purpose. For example, for MMW applications, Rexolite glue, as manufactured by Lord Corporation's Versilok products, of C-LEC PLASTICS INC. Rexolite Adhesive #12517), can be used to secure the woven plastic mesh material on either concave or convex surfaces at a relatively few points by applying a relatively small bead of the adhesive at each point. In other applications as will be discussed below, the woven plastic mesh material can be held in place against the surface of the optical element with a material, such as styrofoam, that is also transparent to microwaves, or mechanically clamped in place at the periphery of the lens by an annular retaining ring. In certain applications where thermal protection is required for the optical elements, styrofoam is preferred for securing the woven plastic mesh layers to the surface of the optical element.

Figure 5:
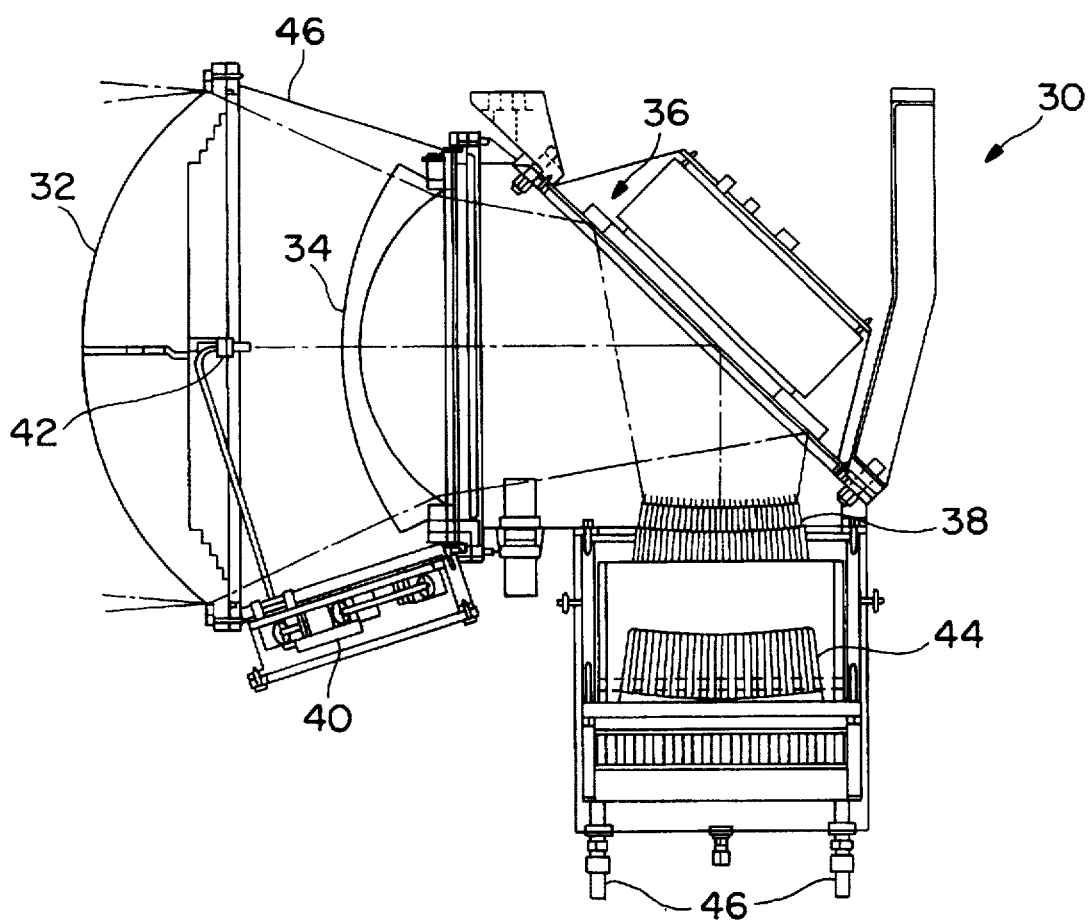
FIG. 5 is a cut out view of a known millimeter wave (MMW) camera having primary and secondary lenses that are adapted to utilize the anti-reflection coating in accordance with the present invention.

Although the anti-reflection coating and method for applying the anti-reflection coating is applicable to various optical elements at various frequencies, the anti-reflection coating in accordance with the present invention is described for illustration purposes in connection with a MMW imaging system as illustrated in FIG. 5 and generally described in U.S. Pat. Nos. 5,047,783; 5,237,334 and 5,530,247, herein incorporated by reference. Briefly, the millimeter wave imaging system as illustrated in FIG. 5, generally identified with the reference numeral 30, includes a primary lens 32 as well as a spaced apart secondary lens 34. The anti-reflection coating in accordance with the present invention is suitable for use on the primary lens 32 as well as the secondary lens 34 in order to reduce reflection losses and thereby to improve the transmittance of millimeter waves through the primary and secondary lenses 32 and 34. The millimeter wave imaging system 30 also includes an oversampling mirror mechanism 36, a focal plane array 38, a calibration source assembly 40, a calibration horn 42, control electronics 44, coolant lines 46, all of which are not directly relevant to the present invention.

As shown in FIG. 5, the secondary lens 34 is disposed within the camera housing 46 while the primary lens 32 is disposed outside of the camera housing 46, forming a cover for the system 30. In this application, the woven plastic mesh material is stretched over the surfaces of both the primary lens 32 as well as the secondary lens 34 and secured by a retaining ring at the periphery of the lenses. In order to provide thermal protection for the primary lens 32, a styrofoam cover (not shown) may be pressed or otherwise held in place to clamp the woven plastic mesh material against the outside surface of the primary lens 32. As mentioned above, in such an application a styrofoam material may be used, since such styrofoam material is transparent to microwaves and thus will not affect the performance of the system. In this application, the styrofoam is preferred in order to provide thermal protection for the exposed primary lens 32. The woven plastic mesh material can be stretched over the secondary lens 34 and secured thereto by way of an adhesive or mechanical clamp as discussed above.

Figure 6:
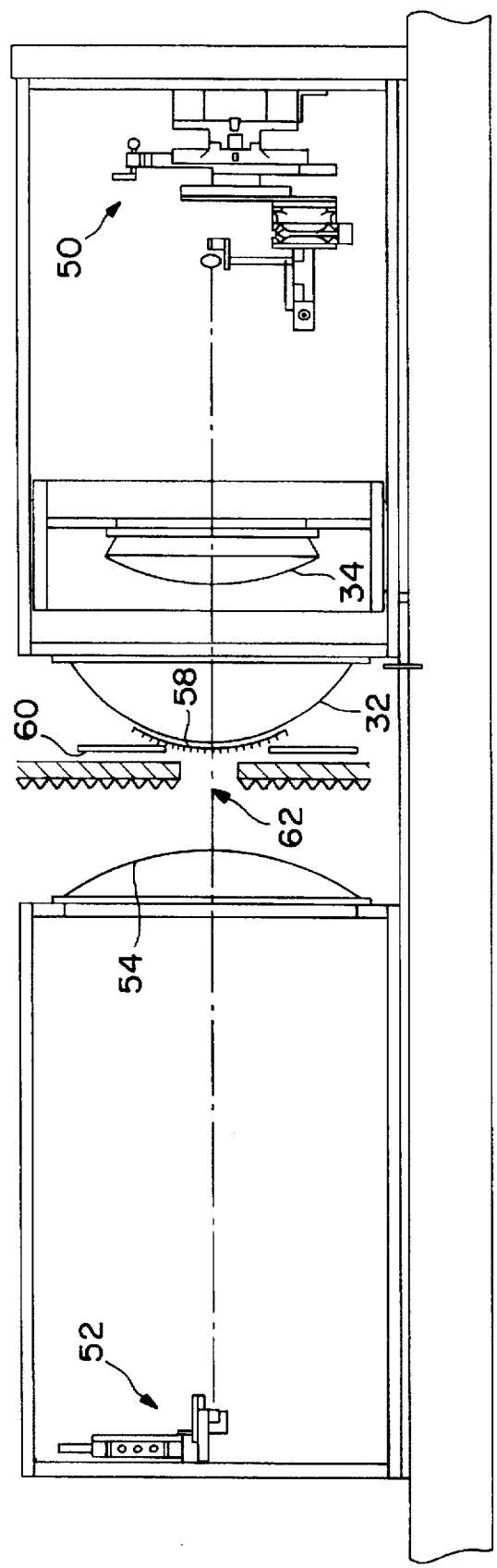
FIG. 6 is an elevational view of an exemplary test setup for testing the anti-reflection coatings on the primary and secondary lenses of the MMW camera illustrated in FIG. 5.

In order to determine the number of layers as well as the thickness of the woven plastic mesh material to be used to minimize the reflective losses of an optical element, an exemplary test fixture for the MMW imaging system 30 is illustrated in FIG. 6. It is to be understood by those of ordinary skill in the art, that various other test fixtures may be used to determine the number and thickness of the layers as well as the various types of woven plastic material to be used in order the minimize the reflective losses of the lens. Referring to FIG. 6, the exemplary test fixture, generally identified by the reference numeral 50, includes a collimated source of MMW radiation 52, for example, a transmitting antenna formed from an open waveguide on a three axis positioner. The collimated source of radiation 52 is directed through the primary 32 and secondary lenses 34 by way of an objective lens 54. A receiving antenna 56, for example, a tapered slot antenna, mounted on 3 translation axes and one rotation axis, is disposed behind the primary 32 and secondary 34 lenses. The transmitting antenna 52 as well as the receiving antenna 56 are connected to power transmission measurement apparatus (not shown) in order to determine the transmittance of the primary and secondary lenses 32 and 34 both with and without the anti-reflection coating in accordance with the present invention.

As shown in FIG. 6, the primary 32 and secondary 34 lenses are held in a spaced apart relationship by the test fixture 50 at the same distance as in the millimeter wave imaging system 30 illustrated in FIG. 5. Various layers of the woven plastic mesh material, identified with the reference numeral 58, are applied to an outer surface of the primary lens 32 and held in place by a retaining plate 60. In order to restrict the angle of incidence to near normal of the electromagnetic radiation on the surface of the primary lens 32, an electromagnetic absorbing material, such as EccoSorb material, as manufactured by Emerson-Cummings is disposed in front of the primary lens 32 and formed with a relatively small aperture 62 which not only restricts the angle of incidence to near normal but also restricts the total area to accommodate a relatively small sample size.

Millimeter waves are transmitted from the transmit antenna 52 to the receive antenna 56, through the primary and secondary lenses 32 and 34, respectively. The power levels of the transmit antenna 52, as well as the receiving antenna 56, are measured by measurement apparatus (not shown) for different anti-reflection coatings 58 and without a coating. The results of the testing of different anti-reflection coatings applied to an outside surface of the primary lens 32 are illustrated in tabular form in FIG. 7 and graphical form in FIG. 8.

Referring to FIG. 7, various types of mesh material are used including fine and coarse mesh materials, as identified in column 62. The number of layers is indicated in column 64, while the thickness of the anti-reflection coating is indicated in column 66. The total reduction in reflection losses is illustrated in column 68. Tests were performed with the anti-reflection coatings in place as indicated in columns 70 and 72 and without the anti-reflection coatings as indicated by columns 74 and 76. As shown in FIG. 7, for five layers of a relatively fine mesh material, the optical reduction of reflection losses is 0.193 db for the primary lens 32.

Figure 8:
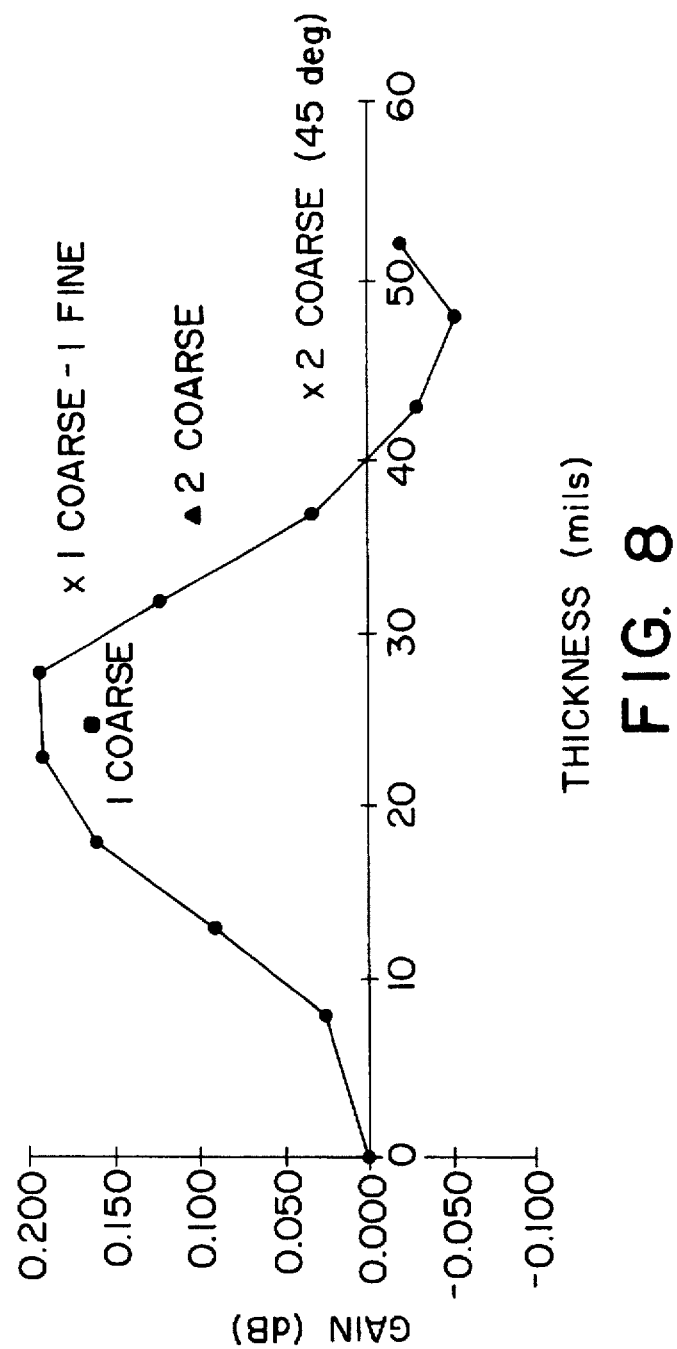
FIG. 8 is a graphical illustration of the data illustrated in FIG. 7 for the anti-reflection coatings in accordance with the present invention.

FIG. 8 illustrates the improvement in the reduction of reflection losses as a function of the thickness of the anti-reflection coating in accordance with the present invention in graphical form. As shown, the optimal performance for the exemplary test was five layers of a relatively fine mesh material at a total thickness of about 28 mils. As shown in FIG. 8, such performance could be matched by one layer of a relatively coarse mesh or a layer of a coarse mesh and a layer of fine mesh.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. An anti-reflection coating for use on an optical element at a predetermined electromagnetic frequency range, the anti-reflection coating comprising:

one or more layers of a predetermined woven plastic material, secured relative to said optical element, wherein the number of layers are selected to minimize the reflection of said optical element.

2. The anti-reflection coating as recited in claim 1, wherein said one or more layers are secured to said optical element with a predetermined adhesive, transparent to said predetermined electromagnetic frequency range.

3. The anti-reflection coating recited in claim 1, wherein said anti-reflection coating is formed from a plurality of layers having the same mesh size.

4. The anti-reflection coating as recited in claim 1, wherein said anti-reflection coating is formed from a plurality of layers having different mesh sizes.

5. The anti-reflection coating as recited in claim 1, wherein said various predetermined optical elements include a predetermined lens.

6. The anti-reflection coating as recited in claim 5, wherein said predetermined lens is convex.

7. The anti-reflection coating as recited in claim 5, wherein said predetermined lens is concave.

8. The anti-reflection coating as recited in claim 1, wherein said anti-reflection coating is formed from a plurality of layers.

9. The anti-reflection coating as recited in claim 1, wherein said plurality of layers have the same thickness.

10. The anti-reflection coating as recited in claim 1, wherein said plurality of layers have at least two (2) different thicknesses.

11. A method for forming an anti-reflection coating for an optical element comprising the steps of:

(a) securing one or more layers of a woven plastic material to a surface of said optical element;

(b) determining the number and thickness of said layers of said woven plastic material by measuring the reduction in reflection losses.

12. In combination with a millimeter wave imaging system which includes one or more lenses, an anti-reflection coating for said one or more lenses, the anti-reflection coating comprising:

one or more layers of a predetermined woven plastic material, secured to at least one of said one or more lenses, the number of layers being selected to minimize reflections of said lens.

13. The system recited in claim 12 further including a predetermined material, transparent to microwaves, for pressing said one or more layers against said lens for securing said one or more layers to said at least one of said one or more lenses.

14. The system recited in claim 13, wherein said predetermined material is selected to provide thermal protection to said primary lens.

15. The system as recited in claim 14, wherein in said predetermined material is styrofoam.

16. The system as recited in claim 12, further including an adhesive for securing one or more layers of said predetermined woven plastic material to at least one of said one or more lenses.

17. The system as recited in claim 12, further including a means for clamping one or more layers of said predetermined woven plastic material to at least one of said one or more lenses.

* * * * *